United States Patent

Pedain et al.

Patent Number: 5,455,297
Date of Patent: Oct. 3, 1995

[54] WATER-BASED COATING COMPOSITIONS AND THEIR USE FOR THE PRODUCTION OF FLEXIBLE COATINGS

[75] Inventors: Josef Pedain, Colonge; Heino Müller, Leverkusen; Dieter Mager, Leverkusen; Manfred Schönfelder, Leverkusen, all of Germany

[73] Assignee: Bayer Aktiengesellschaft, Leverkusen, Germany

[21] Appl. No.: 169,943

[22] Filed: Dec. 20, 1993

Related U.S. Application Data

[63] Continuation of Ser. No. 49,738, Apr. 19, 1993, abandoned.

[30] Foreign Application Priority Data

Apr. 24, 1992 [DE] Germany .......................... 42 13 527.3

[51] Int. Cl.$^6$ .......................... C08G 18/34; C08G 18/80; C09D 175/04
[52] U.S. Cl. .......................... 524/591; 524/840; 528/45; 528/67; 428/425.8
[58] Field of Search .......................... 524/591, 840; 528/45, 67; 428/425.8

[56] References Cited

U.S. PATENT DOCUMENTS

| | | | |
|---|---|---|---|
| 3,959,348 | 5/1976 | Reiff et al. | 521/159 |
| 4,098,933 | 7/1978 | Burkhardt et al. | 427/379 |
| 4,119,602 | 10/1978 | Isgur et al. | 524/507 |
| 4,284,544 | 8/1981 | Wegner et al. | 524/723 |
| 4,294,665 | 10/1981 | Pedain et al. | 524/591 |
| 4,303,774 | 12/1981 | Nachtkamp et al. | 528/71 |
| 4,387,181 | 6/1983 | Brown et al. | 524/591 |
| 4,433,017 | 2/1984 | Goto et al. | 528/45 |
| 4,433,095 | 2/1984 | Hombach et al. | 524/563 |
| 4,501,852 | 2/1985 | Markusch et al. | 524/840 |
| 4,655,223 | 4/1987 | Konig et al. | 524/871 |
| 4,918,129 | 4/1990 | Probst et al. | 524/457 |
| 4,925,885 | 5/1990 | Rosthauser et al. | 528/45 |
| 5,023,309 | 6/1991 | Kruse et al. | 528/49 |
| 5,039,732 | 8/1991 | Arora | 524/591 |
| 5,098,983 | 3/1992 | Mosbach et al. | 528/59 |
| 5,194,487 | 3/1993 | Jacobs | 524/840 |
| 5,250,610 | 10/1993 | Häsel et al. | 524/591 |
| 5,300,556 | 4/1994 | Tirpak et al. | 524/591 |
| 5,308,914 | 5/1994 | Wallon et al. | 524/591 |
| 5,334,650 | 8/1994 | Serdiuk et al. | 524/840 |

FOREIGN PATENT DOCUMENTS

| | | |
|---|---|---|
| 22452 | 1/1981 | European Pat. Off. . |
| 424697 | 5/1991 | European Pat. Off. . |
| 2708611 | 5/1978 | Germany . |
| 1444933 | 8/1976 | United Kingdom . |

*Primary Examiner*—James J. Seidleck
*Assistant Examiner*—Rabon Sergent
*Attorney, Agent, or Firm*—Joseph C. Gil; Thomas W. Roy

[57] ABSTRACT

The present invention relates to a heat-crosslinkable water-based coating composition containing as binder a) a water-soluble or water-dispersible polyol component and b) a water-soluble or water-dispersible blocked polyisocyanate which has an average NCO functionality of 2.0 to 2.6 and is based on the reaction product of b1) a polyisocyanate mixture having an average NCO functionality of 2.5 to 3.5 and containing (i) at least 15% by weight of an organic diisocyanate, b2) a blocking agent for isocyanate groups in an amount of 50 to 80 equivalent-%, based on the isocyanate groups of component b1) and b3) an aliphatic monohydroxymonocarboxylic acid in a quantity of 20 to 50 equivalent-%, based on the isocyanate groups of component b1) and the hydroxyl groups of component b3), wherein the equivalent ratio, based on the isocyanate-reactive groups of blocking agent b2) and the hydroxyl groups of component b3) to the isocyanate groups of component b1) is at least 0.9:1.

3 Claims, No Drawings

WATER-BASED COATING COMPOSITIONS AND THEIR USE FOR THE PRODUCTION OF FLEXIBLE COATINGS

This application is a continuation of application Ser. No. 08/049,738 filed Apr. 19, 1993, abandoned.

BACKGROUND OF THE INVENTION

1. Field of the Invention

The present invention relates to new water-based coating compositions for the production of stoving lacquers, more particularly for the production of elastic fillers for the coating of car bodies.

2. Description of the Prior Art

In recent years, water-based lacquers and coating compositions have acquired increasing significance in view of increasingly stricter emission guidelines regarding the solvents released during the application of coatings. Although in the meantime water-based coating compositions have been developed for many applications, they often do not attain the high quality level of conventional, solvent-containing coating compositions in regard to resistance to solvents and chemicals and also elasticity (flexibility) and mechanical stability. More particularly, there are still no polyurethane-based coating compositions applied from the aqueous phase which satisfy the stringent practical requirements which elastic fillers for the coating of car bodies are expected to meet in regard to impact strength, resistance to chipping and resistance to water and chemicals.

This applies to GB-PS 1,444,933, EP-A-0,061,628 and DE-AS 2,359,613, which are concerned with the hydrophilic modification of aromatic polyisocyanates; DE-OS 4,001,783, which is concerned with special anionically modified aliphatic polyisocyanates; and also to the systems according to DE-OS 2,456,469, DE-OS 2,814,815, EP-A-0,012,348 and EP-A-0,424,697, which are concerned with water-based binders for stoving lacquers based on blocked polyisocyanates and organic polyhydroxyl compounds. The systems based on carboxy-functional polyurethane prepolymers containing blocked isocyanate groups according to DE-OS 2,708,611 and the highly functional, blocked water-soluble urethane prepolymers according to DE-OS 3,234,590 are mostly unsuitable for the production of flexible coatings.

It has now been found that stoving fillers which can be applied from aqueous phase and which satisfy the requirements stated above can be produced, provided that selected combinations of the type described in more detail hereinafter of a) water-soluble or water-dispersible polyhydroxyl compounds containing special water-soluble or water-dispersible blocked polyisocyanates b) are used as binders.

SUMMARY OF THE INVENTION

The present invention relates to a heat-crosslinkable water-based coating composition containing a binder which comprises a) a water-soluble or water-dispersible polyol component and b) a water-soluble or water-dispersible polyisocyanate component which contains blocked isocyanate groups, has an average NCO functionality, based on the reversibly blocked isocyanate groups, of 2.0 to 2.6 and comprises the reaction product of
b1) a polyisocyanate mixture having an average NCO functionality of 2.5 to 3.5 and containing (i) at least 15% by weight of a diisocyanate component containing one or more organic diisocyantes and (ii) a polyisocyanate component containing one or more trifunctional or higher functional polyisocyanates, wherein component ii) is present in an amount sufficient to provide polyisocyanate mixture b1) with an average NCO functionality of 2.5 to 3.5,
b2) one or more reversible, monofunctional blocking agents for isocyanate groups in an amount of 50 to 80 equivalent-%, based on the isocyanate groups of component b1) and
b3) one or more aliphatic monohydroxymonocarboxylic acids in a quantity of 20 to 50 equivalent-%, based on the isocyanate groups of component b1) and the hydroxyl groups of component b3),
wherein said reaction product is at least partly converted into salt form by neutralization of the incorporated carboxyl groups, and
wherein the equivalent ratio, based on the isocyanate-reactive groups of blocking agent b2) and the hydroxyl groups of component b3) to the isocyanate groups of component b1) is at least 0.9:1.

The present invention also relates to metallic substrates coated with these coating compositions.

DETAILED DESCRIPTION OF THE INVENTION

Binder component a) is selected from water-soluble or water-dispersible polyhydroxyl compounds having an average molecular weight ($M_n$, calculated from the hydroxyl group content and the hydroxyl functionality) of 1000 to 100,000, preferably 2000 to 10,000. These polyhydroxyl compounds are known from polyurethane coatings technology and should have a content of hydrophilic groups, more particularly polyether chains containing ethylene oxide units and/or carboxylate groups, which are sufficient to render the polyhydroxyl compound soluble or dispersible in water. However, it is also possible to use polyhydroxyl compounds which are not sufficiently hydrophilic on their own in admixture with external emulsifiers.

Component a) is selected from known polyhydroxy polyesters, polyhydroxy polyethers and other hydroxy-functional polymers, e.g., polyhydroxy polyacrylates. These polyols have a hydroxyl value of 20 to 200, preferably 50 to 130, based on solids.

The polyhydroxyl polyacrylates are known copolymers of styrene with esters of acrylic and/or methacrylic acid. Hydroxyalkyl esters (such as the 2-hydroxyethyl, 2-hydroxypropyl and 2-, 3- or 4-hydroxybutyl esters of these acids) are used to introduce the hydroxyl groups.

Suitable polyether polyols are the known ethoxylation and/or propoxylation products of suitable 2- to 4-functional starter molecules such as water, ethylene glycol, propanediol, trimethylol propane, glycerol and/or pentaerythritol.

Examples of suitable polyester polyols are the known reaction products of polyhydric alcohols, such as the previously described alkane polyols, with excess quantities of polycarboxylic acids or polycarboxylic anhydrides, preferably dicarboxylic acids or dicarboxylic anhydrides. Suitable polycarboxylic acids or polycarboxylic anhydrides include adipic acid, phthalic acid, isophthalic acid, phthalic anhydride, tetrahydrophthalic anhydride, hexahydrophthalic anhydride, maleic acid, maleic anhydride, Diels-Alder adducts thereof with cyclopentadiene, fumaric acid and dimeric or trimeric fatty acids. Mixtures of the polyhydric alcohols and mixtures of the acids or anhydrides may also be used for the production of the polyester polyols.

The polyester polyols are produced by known methods as described, for example, in Houben-Weyl, Methoden der Organischen Chemie, Vol. XIV/2, G. Thieme-Verlag, Stuttgart, 1963, pages 1 to 47.

The hydrophilic modification to which these polyhydroxyl compounds may have to be subjected is carried out by known methods as described, for example, in EP-B-0, 157,291 or EP-A-0,427,028 (U.S. Pat. No. 5,126,393, herein incorporated by reference). The water-soluble or water-dispersible, urethane-modified polyesters described in these prior publications are particularly suitable. The water-soluble or water-dispersible hydroxy-functional polymers described in DE-OS 3,829,587 (U.S. Pat. No. 5,075,370, herein incorporated by reference) are also suitable in accordance with the invention as component a).

The selection of polyisocyanate component b) is a critical feature of the present invention. Polyisocyanate component b) contains a water-soluble or water-dispersible blocked polyisocyanate having an NCO functionality of 2.0 to 2.6, based on the blocked isocyanate groups. It is important that polyisocyanate component b) is based on certain polyisocyanate mixtures b1) in which both diisocyanates and tri-functional and/or higher polyisocyanates are present, because it is only in this way that the conflicting properties required (such as good elasticity and a high crosslink density, i.e., resistance to water and chemicals) can be obtained.

The polyisocyanate mixtures b1) used for the production of component b) have an average NCO functionality of 2.5 to 3.5 and contain at least 15% by weight of a diisocyanate component containing at least one organic diisocyanate and a quantity of a polyisocyanate component containing at least one trifunctional or higher polyisocyanate, which is sufficient to provide the required NCO functionality.

Suitable diisocyanates include 1-isocyanato-3,3,5-trimethyl-5-isocyanatomethyl cyclohexane (IPDI) or 4,4'-diisocyanatodicyclohexyl methane. Difunctional derivatives of hexamethylene diisocyanate (HDI), for example, the uretdione diisocyanate corresponding to the formula

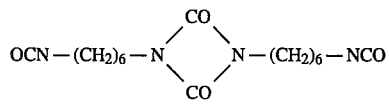

which preferably has a free HDI content of less than 0.5% by weight, are also suitable as the diisocyanate component of component b1) according to the invention.

The uretdione diisocyanate just mentioned is formed by the oligomerization of hexamethylene diisocyanate by known methods as described, for example, in DE-OS 1,670,720, DE-OS 3,437,635, DE-OS 3,432,081, DE-OS 3,809,261 (U.S. Pat. No. 5,043,092), herein incorporated by reference) and DE-OS 3,900,053 (U.S. Pat. No. 4,994,451, herein incorporated by reference). In addition to the dimerization product containing uretdione groups, isocyanurate-group-containing trimerization products of relatively high functionality are also generally formed during the oligomerization reaction such that the average functionality of the oligomerization products ranges from 2.0 to 2.7. When oligomerization products of the type in question are used, the percentage of trifunctional and higher polyisocyanates already present must be taken into consideration in the calculation of the average NCO functionality of the mixture b1).

Suitable trifunctional and higher polyisocyanates are known and include at least trifunctional polyisocyanates containing aromatically, but preferably (cyclo)aliphatically bound isocyanate groups. Particularly suitable are derivatives of hexamethylene diisocyanate which contain urethane, allophanate, biuret and, in particular, isocyanurate groups; contain less than 0.2% by weight free hexamethylene diisocyanate; and have an average NCO functionality of 3 to 6.

In a particularly preferred embodiment, the higher functional polyisocyanate is a hexamethylene diisocyanate derivative which contains isocyanurate groups, contains less than 0.2% by weight free hexamethylene diisocyanate and has an average NCO functionality of 3.8 to 4.2.

Starting mixtures b1) generally have an NCO content of approximately 15 to 30% by weight. To produce polyisocyanate component b), 50 to 80% of the isocyanate groups of starting mixtures b1) are blocked with blocking agents b2) in known manner and 20 to 50% of the isocyanate groups are reacted with monohydroxycarboxylic acids b3). The reactions with these two components may be carried out in any order. The only requirements are that 1) the equivalent ratio, based on the isocyanate-reactive groups of blocking agent b2) and the hydroxyl groups of component b3) to the isocyanate groups of component b1) is at least 0.9:1 and, 2) when the number of isocyanate groups of b1) is smaller than the sum of isocyanate-reactive groups of b2) and of hydroxy groups of b3), the monohydroxycarboxylic acid b3) is reacted before the total quantity of blocking b2) so that at least one isocyanate group of component b1) is available for every hydroxyl group of component b3). It is possible to use a slight excess of isocyanate groups of component b1) or isocyanate-reactive groups of blocking agent b2). Accordingly, the above-mentioned equivalent ratio is at least 0.9:1, preferably 0.95:1 to 1.1:1.

Suitable monofunctional blocking agents are known and include ε caprolactam, malonic acid diethyl ester, acetoacetic acid ethyl ester and oximes, such as butanone oxime. Butanone oxime is the preferred blocking agent.

Suitable hydroxycarboxylic acids b3) include 2-hydroxyacetic acid, 3-hydroxypropanoic acid or 12-hydroxy-9-octadocanoic acid (ricinoleic acid). Preferred carboxylic acids are those in which the carboxyl group is hindered in its reactivity by steric effects. 3-hydroxy-2,2-dimethyl propanoic acid (hydroxypivalic acid) is particularly preferred.

To produce polyisocyanate component b), starting mixture b1) may be reacted with the blocking agent b2) and the hydroxycarboxylic acid b3) either successively in any order or simultaneously. In a preferred embodiment, a portion of the blocking agent is initially reacted followed by the hydroxycarboxylic acid and then by the rest of the blocking agent. In accordance with this embodiment, a slight excess of blocking agent may be used. However, the reaction may also be continued, provided that small numbers of unreacted NCO groups are still present in the reaction mixture. The reactions are generally conducted at 0° C. to 120° C., preferably at 20° C. to 60° C. The hydroxycarboxylic acid b3) in particular is reacted under mild conditions to prevent the carboxyl group from reacting with the NCO groups.

The reactions may be carried out in the absence of solvents or in an inert solvent which may optionally be removed by distillation after the reaction, neutralization and taking up in water. Suitable solvents are those which are not reactive towards NCO groups, e.g., ketones such as acetone and methyl ethyl ketone; esters such as ethyl acetate; and also solvents such as N-methyl pyrrolidone, which may remain in the coating composition in small quantities to perform a stabilizing or flow-control function.

On completion of the reaction, the incorporated carboxyl groups are at least partly neutralized with a suitable neutralizing agent. Suitable neutralizing agents include alkali metal or alkaline earth metal hydroxides, but preferably tertiary amines, such as triethyl amine, triethanolamine and, especially, N-dimethyl ethanolamine. In general, at least 80% of the carboxyl groups present are neutralized; the neutralizing agent may be used in excess. Component b) preferably has a content of carboxylate groups of 60 to 130 milliequivalents per 100 g solids.

After neutralization, water is added, preferably in such a quantity that 20 to 50% by weight aqueous solutions or dispersions of component b) are formed. If a low boiling solvent has been used in the production of polyisocyanate component b), this solvent may be removed from the aqueous phase, for example, by vacuum distillation. As already mentioned, higher boiling solvents, such as N-methyl pyrrolidone, may remain in the coating composition in small quantities (less than 10% by weight). They act as both flow control agents and as stabilizing aids.

In an alternative embodiment, the aqueous solutions or dispersions may also be obtained by a procedure in which polyisocyanates b) containing free carboxyl groups and blocked isocyanate groups, optionally in the form of an organic solution, are mixed with an aqueous solution of a neutralizing agent so that neutralization and dissolution or dispersion take place in a single stage.

To produce the coating compositions according to the invention, the aqueous solutions or dispersions of polyhydroxyl component a) are preferably mixed with the aqueous solution or dispersion of blocked polyisocyanate b), preferably in such quantities that the equivalent ratio of blocked isocyanate groups of component b) to alcoholic hydroxyl groups of component a) is 0.6:1 to 1.5:1, more preferably 0.7:1 to 1:1. It is also be possible, although less preferred, to mix the aqueous solution or dispersion of polyhydroxyl component a) with the neutralizing agent and to then blend in the unneutralized blocked polyisocyanate b), optionally in the form of an organic solution.

Known additives, e.g., pigments, flow control agents, bubble-preventing agents, catalysts and also other binders (such as melamine/formaldehyde or urea/formaldehyde resins), may be added to the water-based binder mixture or to individual components a) or b) before they are combined.

The coating compositions according to the invention may be applied to heat-resistant substrates in one or more layers by known methods, for example, by spray coating, spread coating, dip coating, flood coating or by means of rollers and coating knives.

Coatings on metal, plastics, wood or glass are obtained, for example, by curing the coatings at 80° to 220° C., preferably 130° to 180° C.

The coating compositions according to the invention are particularly suitable for the production of coatings and lacquer finishes on steel plates of the type used, for example, in the manufacture car bodies, machines, linings, vessels or containers. They are preferably used for the production of automotive fillers. The lacquer films generally have a dry layer thickness of 0.01 to 0.3 mm.

The binders according to the invention provide longlasting surface protection, as demonstrated in the following examples. The high chip resistance is particularly emphasized and makes the binders eminently suitable for applications where high resistance to chipping is required.

The particular advantage of the new water-based binders is their stability in storage both at room temperature and at slightly elevated temperatures of 30° to 60° C. Another advantage of the new water-based binders is that they can readily be worked up and recycled by ultrafiltration.

In the following examples, all parts and percentages are by weight, unless otherwise indicated.

EXAMPLES

Example 1

Production and description of the starting materials 1.1. 4,4'-diisocyanatodicyclohexyl methane (Desmodur W, a product of Bayer AG), NCO functionality 2.0

1.2. Oligomerization product of 1,6-diisocyanatohexane, NCO functionality 2.3

2000 g of 1,6-diisocyanatohexane were introduced into a suitable reaction vessel and heated to 50° C. 20 g of 2,2,4-trimethylpentane-1,3-diol and then 30 g of tri-n-butyl phosphine were introduced with stirring in a nitrogen atmosphere. The exothermic reaction was kept at 60° C. by cooling. After a reaction time of 6 h, the reaction mixture had an NCO content of 42.5%. The reaction was then terminated by adding 16.5 g of toluene sulfonic acid methyl ester and heating for 2 hours at 80° C. The crude product thus obtained was then freed from excess starting diisocyanate in a downflow evaporator (165° C./1 mbar) and thin-layer evaporator (150° C./0.30 mbar).

The resulting product had the properties:

| | |
|---|---|
| NCO content (%) | 21.6 |
| Viscosity (mPa · s/23° C.) | 200 |
| Hazen color value | 50 |
| Free starting diisocyanate (%) | 0.2 |
| NCO functionality | approx. 2.3 |

Analysis by gel chromatography showed that 72% of the oligomerization product was the uretdione diisocyanate of formula (I) and the remainder was tris-(6-isocyanatohexyl) isocyanurate, higher homologs thereof, urethanized products and higher homologs of uretdione diisocyanate.

1.3. Oligomerization product of 1,6-diisocyanatohexane having an NCO functionality of 3.9

Thin-layered isocyanurate polyisocyanate prepared from 1,6-diisocyanatohexane in accordance with Example 1 of EP-A 0,010,89 (U.S. Pat. No. 4,324,879); NCO content 21.5%, viscosity (25° C.) 2100 mPa.s, content of monomeric 1,6-diisocyanatohexane 0.1% and content of triisocyanatohexyl monoisocyanurate approx. 49%. The remainder was a mixture of higher molecular weight homologs containing 2 or more isocyanurate groups per molecule. The average NCO functionality was approx. 3.9.

Example 2

Production of polyisocyanate component b) dissolved in water

Constituents:

97.5 g of the polyisocyanate of Example 1.3

65.5 g of the polyisocyanate of Example 1.1

56.6 g of butanone oxime 27.5 g of hydroxypivalic acid 29.7 g of dimethyl aminoethanol (DMAE)

15.4 g of N-methyl pyrrolidone (NMP)

325.0 g of water

Reaction procedure

A first portion of 34.8 g of butanone oxime was added to the mixture of the two polyisocyanates (average NCO functionality: approx. 2.6) with cooling at a temperature just below 80° C. at such a rate that a temperature of 80° C. was not exceeded. After cooling to 50° to 60° C., NMP and hydroxypivalic acid were added. The mixture was then slowly heated to 90° to 100° C. Initially the reaction was slightly exothermic. The reaction was terminated after 5 to 8 hours at that temperature when an NCO content of 4.3 to 4.6% was measured by titration with dibutyl amine. After slow addition of the remaining quantity of butanone oxime (21.8 g), the mixture was briefly stirred at 90° C. until the NCO content as measured by IR was 0. The mixture was then neutralized with DMAE. After another 10 minutes, the reaction mixture was dispersed at 80° to 90° C. with 325 g of water heated to between 60° and 70° C. A clear solution having a solids content of 40% and a viscosity of 25,000 mPa.s at 23° C. was obtained. The blocked isocyanate content was 4.4% in solution. The functionality, based on blocked NCO, was 2.03.

Example 3

Production of a polyisocyanate component dissolved in water
Constituents:
146.3 g of the polyisocyanate of Example 1.3
48.8 g of the polyisocyanate of Example 1.2
56.6 g of butanone oxime
27.5 g of hydroxypivalic acid
31.2 g of dimethyl aminoethanol (DMAE)
17.5 g of NMP
370.0 g of water
Reaction procedure A first portion of 34.8 g of butanone oxime was added to the mixture of the two polyisocyanates (average NCO functionality: approx. 3.3) with cooling at a temperature just below 80° C. at such a rate that a temperature of 80° C. was not exceeded. After cooling to 50° to 60° C., NMP and hydroxypivalic acid were added. The mixture was then slowly heated to 90° to 100° C. Initially the reaction was slightly exothermic. The reaction was terminated after 3 to 5 hours at that temperature when an NCO content of 3.5 to 3.8% was measured by titration with dibutyl amine. After slow addition of the remaining quantity of butanone oxime (21.8 g), the mixture was briefly stirred at 90° C. until the NCO content as measured by IR was 0. The mixture was then neutralized with DMAE. After another 10 minutes, the reaction mixture was dispersed at 80° to 90° C. with 370 g of water heated to between 60° and 70° C. A clear solution having a solids content of 40% and a viscosity of 30,000 mPa.s at 23° C. was obtained. The blocked isocyanate content was 3.9% in solution. The functionality, based on blocked NCO, was 2.55.

Example 4

Water-based, hydroxy-functional urethanized polyester resin
509 g of peanut oil fatty acid, 1051 g of hexane-1,6-diol, 560 g of cyclohexane-1,4-dimethanol, 1093 g of adipic acid, 1243 g of isophthalic acid and 940 g of trimethylol propane were weighed into a 10 liter reaction vessel equipped with a stirrer, heating and cooling system and water separator, and esterified at 220° C. until the acid value was ≦5.

3540 g of of this polyester and 330 g of dimethylol propionic acid were dissolved in 700 g of N-methyl pyrrolidone and, after the addition of 10 g of dibutyl tin oxide, the resulting solution was reacted with 1000 g of isophorone diisocyanate at 70° C. The reaction was continued at 70° to 110° C. until no more NCO groups could be detected. After the addition of 135 g of methyl diethanolamine, the resin was dispersed in 5100 g of water. An approximately 45% resin solution was obtained. The organic solvent content was 6.5%. The content of reactive hydroxyl groups bound to the polyester resin was 1.17%.

Example 5

Water-based, hydroxy-functional urethanized polyester resin
361 g of benzoic acid, 2316 g of trimethylol propane, 2853 g of hexane-1,6-diol, 1602 g of cyclohexane-1,4-dimethanol, 3130 g of adipic acid, 2931 g of isophthalic acid and 300 g of dimer fatty acid (Pripol 1008, a product of Unichema) were weighed into a 15 liter reaction vessel equipped with a stirrer, heating and cooling system and water separator, and esterified at 210° C. until the acid value was ≦ 3.

1020 g of of this polyester together with 87 g of dimethylol propionic acid were dissolved in 2000 g of acetone at 60° C. After addition of 1.5 g of dibutyl tin dilaurate as catalyst, 230 g of isophorone diisocyanate and 65 g of 4,4'-diisocyanatodicyclohexyl methane were added and the mixture was stirred at 60° C. until no more free NCO groups could be detected. After the addition of 35 g of dimethyl ethanolamine and 1600 g of water, the acetone was removed by distillation. An approximately 45% resin solution containing no organic solvents was obtained. The solution had a content of isocyanate-reactive hydroxyl groups of 1%.

Example 6

Formulation of a filler resin of aqueous blocked isocyanate and aqueous hydroxyl component)
22.0 parts of the water-based resin of Example 4 and 21.6 parts of the water-based resin of Example 5 were thoroughly mixed with 19.3 parts of the aqueous polyisocyanate of Example 3. The blocked NCO:OH equivalent ratio was 0.7. 15 parts of titanium dioxide (rutile), 0.2 parts of iron oxide black, 4.8 parts of heavy spar and 2.1 parts of talcum were dispersed in the mixture in a bead mill over a period of 30 minutes at 2800 rpm. 0,45 parts of Additol XW 395, 0,45 parts of Surfinol 104E (commercial surface-active additives of Vianova Hoechst (Vienna, Austria resp. of Air Product) as well as 0,4 parts of Aerosil R 972 (commercial SiO$_2$-based filler of Degussa, Germany) were then added together with 13.5 parts of deionized water. A pH value of 8 was established by adding 0.2 parts of N-dimethyl ethanolamine.

Example 7

Formulation of a filler resin of aqueous blocked isocyanate and aqueous polyhydroxyl component
The following constituents were mixed in a bead mill at a blocked NCO:OH equivalent ratio of 0.7 using the procedure described in Example 6:
22.7 parts of the water-based hydroxyl resin of Example 4
22.2 parts of the water-based hydroxyl resin of Example 5
17.5 parts of the water-based polyisocyanate of Example 2
15.0 parts of TiO$_2$
0.1 parts of iron oxide black 4.8 parts of BaSO$_4$ 2.1 parts of talcum 13.1 parts of deionized H$_2$O 0,5 parts of Additiol XW 395

0,5 parts of Surfinol 104E 0,4 parts of Aerosil R 972

0,2 parts of N-dimethyl ethanolamine

The paste had a pH value of 8.

Comparison Example 8

Formulation of a filler in accordance with the prior art

The following constituents were mixed and the resulting mixture was dispersed in a bead mill:

26.1 parts of the water-based hydroxyl resin of Example 4

25.5 parts of the water-based hydroxyl resin of Example 5

4.4 parts of a water-soluble hexamethoxymethyl melamine resin 15.1 parts of titanium dioxide 0.1 parts of iron oxide black 4.8 parts of barium sulfate 2.1 parts of talcum 20.2 parts of deionized water 0,5 parts of Additiol XW 395

0,5 parts of Surfinol 104E 0,4 parts of Aerosil R 972

0,2 parts of N-dimethyl ethanolamine

The paste had a pH value of 8.

Example 9

Application of the resins obtained in Examples 6, 7 and 8 as stoving filler systems The water-based resins of Examples 6, 7 and 8 were diluted with deionized water to a viscosity represented by a flow time of approx. 30 s (DIN cup, 4 mm/23° C.) and applied by spraying with a flow cup gun (air pressure 5 bar, 65% rel. humidity/23° C.) to zinc-phosphated steel plates coated with a primer applied by cathodic electrodeposition (thickness approx. 20 μm).

After air drying for 10 minutes at 23° C., the filler was cured in a recirculating air oven for 10 minutes at 75° C. and for 20 minutes at 165° C. The dry film thickness was approx. 35 μm.

a) A commercially available auto surface lacquer based on an alkyd/melamine resin was applied to the filler layer in a dry film thickness of approx. 35/μm and dried for 30 mins. at 130° C., after which b) a water-based metallic base coat was applied in a dry film thickness of approx. 20 μm, and then coated after 10 mins. at 80° C. with a two-component PUR clear lacquer (35 μm dry film) and stoved for 30 mins. at 130° C.

The test results are shown in Table 1 below. The resistance properties of the film (i.e., solvent, water and salt spray resistance) meet established requirements.

Evaluation methods:

Surface lacquer quality

The gloss and surface of the coating on various fillers was subjectively evaluated in percent on the basis of optical reference values (100=very good; 0=very poor).

Chip resistance

The following test machines were used:

a) BDA chip tester (Erichsen Model 508) with 2×500 g of steel shot (sharp edges, 4 to 5 mm) projected under an air pressure of 1.5 bar at 23° C.

Samples were taken to assess surface lacquer adhesion (1 to 3, 1=very good surface adhesion, 3=flaking between surface lacquer and filler) and chips through to the metal substrate (0 to 10, 0=no chips, 10=numerous chips)

b) Mercedes-Benz Type 490 chip testing machine (23° C. and 20° C.)

Evaluations were carried out to determine surface lacquer adhesion (1 to 3) and chips through to the steel substrate in mm$^2$

TABLE 1

| | Example | | |
|---|---|---|---|
| | 6 | 7 | 8 |
| Surface lacquer quality | | | |
| a) | 80% | 80% | 80% |
| b) | 90% | 90% | 90% |
| VDA chip resistance Chips | | | |
| a) | 0 | 0 | 1 |
| b) | 0 | 0 | 0 |
| Surface lacquer adhesion | | | |
| a) | 1 | 1 | 2 |
| b) | 1 | 1 | 2 |
| Chip resistance, MB 490 Chips 23° C./–20° C. | | | |
| a) | 0/0 | 0/0 | 0/1 |
| b) | 0/0 | 0/0 | 0/1 |
| Surface lacquer adhesion 23° C./–20° C. | | | |
| a) | 1/1 | 1/1 | 2/2 |
| b) | 1/1 | 1/1 | 2/2 |
| Filler on steel plate | | | |
| Erichsen indentation (DIN 53 156) | 10 | 10 | 10 |
| Crosshatch adhesion test (DIN 53 151) | Gt 0 | Gt 0 | Gt 0 |
| Filler on glass plate | | | |
| Pendulum hardness (DIN 53 157) | 115 s | 133 s | 80 s | a) Surface lacquer (alkyd/melamine)
b) Surface lacquer (two-layer PUR)

Summary of the results

Table 1 demonstrates Examples 6 and 7 were equivalent to Comparison Example 8 in most of the properties tested; however, the examples according to the invention were distinctly superior in the crucial properties of chip resistance and surface hardness. Adhesion to the surface lacquer was also better in Examples 6 and 7 than in Comparison Example 8.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A heat-crosslinkable water-based coating composition containing a binder which comprises a) a water-soluble or water-dispersible polyol component and b) a water-soluble or water-dispersible polyisocyanate component which contains blocked isocyanate groups, has an average NCO functionality, based on the reversibly blocked isocyanate groups, of 2.0 to 2.6 and comprises the reaction product of b1) a polyisocyanate mixture having an average NCO functionality of 2.5 to 3.5 and containing (i) at least 15% by weight of a diisocyanate component containing one or more organic diisocyantes and (ii) a polyisocyanate component containing one or more trifunctional or higher functional polyisocyanates, wherein component ii) is present in an amount sufficient to provide polyisocyanate mixture b1) with an average NCO functionality of 2.5 to 3.5, b2) one or more reversible, monofunctional blocking agents for isocyanate groups in an amount of 50 to 80 equivalent-%, based on the isocyanate groups of component b1) and b3) one or more aliphatic monohydroxymonocarboxylic acids in a quantity of 20 to 50 equivalent-%, based on the isocyanate groups of component b1) and the hydroxyl groups of component b3), wherein said reaction product is at least partly converted into salt form by neutralization of the incorporated carboxyl groups, and wherein the equivalent ratio, based on the isocyanate-reactive groups of blocking agent b2) and the hydroxyl groups of component b3) to the isocyanate groups of component b1) is at least 0.9:1.

2. The coating composition of claim 1 wherein components a) and b) are present in quantities corresponding to an equivalent ratio of blocked isocyanate groups to hydroxyl groups of 0.6:1 to 1.5:1.

3. A metallic substrate coated with the coating composition of claim 1.

* * * * *